(12) United States Patent
Czaplicki et al.

(10) Patent No.: US 6,846,559 B2
(45) Date of Patent: Jan. 25, 2005

(54) ACTIVATABLE MATERIAL

(75) Inventors: Michael J. Czaplicki, Rochester, MI (US); David Kosal, Richmond, MI (US)

(73) Assignee: L&L Products, Inc., Romeo, MI (US)

( * ) Notice: Subject to any disclaimer, the term of this patent is extended or adjusted under 35 U.S.C. 154(b) by 0 days.

(21) Appl. No.: 10/386,287

(22) Filed: Mar. 11, 2003

(65) Prior Publication Data
US 2003/0186049 A1 Oct. 2, 2003

Related U.S. Application Data
(60) Provisional application No. 60/369,001, filed on Apr. 1, 2002.

(51) Int. Cl.$^7$ ............................................... B32B 27/38
(52) U.S. Cl. ........................... 428/355 EP; 428/336; 428/301.4; 521/135; 523/443; 525/119; 525/122; 525/530; 525/531
(58) Field of Search ................... 428/355 EP, 355 CN, 428/301.4, 336, 355 BL; 521/135; 523/443; 525/119, 122, 530, 531, 526

(56) References Cited

U.S. PATENT DOCUMENTS

| | | |
|---|---|---|
| 4,427,481 A | 1/1984 | Smith et al. |
| 4,538,380 A | 9/1985 | Colliander |
| 4,693,775 A | 9/1987 | Harrison et al. |
| 4,724,243 A | 2/1988 | Harrison |
| 4,749,434 A | 6/1988 | Harrison |
| 4,769,166 A | 9/1988 | Harrison |
| 4,898,630 A | 2/1990 | Kitoh et al. |
| 4,908,273 A * | 3/1990 | Urech et al. ................. 428/413 |
| 4,922,596 A | 5/1990 | Wycech |
| 4,923,902 A | 5/1990 | Wycech |
| 4,978,562 A | 12/1990 | Wycech |
| 4,995,545 A | 2/1991 | Wycech |
| 5,124,186 A | 6/1992 | Wycech |
| 5,266,133 A | 11/1993 | Hanley et al. |
| 5,274,006 A * | 12/1993 | Kagoshima et al. ........... 521/85 |
| 5,470,886 A | 11/1995 | Makhlouf et al. |
| 5,475,039 A * | 12/1995 | Butikofer |
| 5,648,401 A | 7/1997 | Czaplicki et al. |
| 5,712,317 A | 1/1998 | Makhlouf et al. |
| 5,755,486 A * | 5/1998 | Wycech |
| 5,783,272 A | 7/1998 | Wong |
| 5,884,960 A | 3/1999 | Wycech |
| 5,894,071 A | 4/1999 | Merz et al. |
| 5,932,680 A | 8/1999 | Heider |
| 5,948,508 A | 9/1999 | Pastore et al. |
| 5,964,979 A | 10/1999 | George et al. |
| 5,985,435 A | 11/1999 | Czaplicki et al. |
| 5,994,422 A | 11/1999 | Born et al. |
| 6,004,425 A | 12/1999 | Born et al. |
| 6,030,701 A | 2/2000 | Johnson et al. |
| 6,040,350 A | 3/2000 | Fukui |
| 6,057,382 A | 5/2000 | Karim et al. |
| 6,077,884 A | 6/2000 | Hess et al. |
| 6,096,791 A | 8/2000 | Born et al. |

(List continued on next page.)

FOREIGN PATENT DOCUMENTS

| | | |
|---|---|---|
| EP | 0442178 A1 | 8/1991 |
| EP | 1 072 647 A2 * | 1/2001 |
| EP | 1 240 266 B1 | 2/2004 |
| EP | 1 272 587 B1 | 5/2004 |
| EP | 1 155 084 B1 | 6/2004 |
| EP | 1 431 325 A1 | 6/2004 |
| EP | 1 075 498 B1 | 7/2004 |
| JP | 4059820 | 2/1992 |
| WO | WO 95/33785 | 12/1995 |
| WO | WO 97/02967 | 1/1997 |
| WO | WO 97/12929 | 4/1997 |
| WO | WO 97/19124 | 5/1997 |
| WO | WO 98/52997 | 11/1998 |
| WO | WO 99/02578 | 1/1999 |
| WO | WO 00/12571 | 3/2000 |
| WO | WO 00/12595 | 3/2000 |
| WO | WO 00/13876 | 3/2000 |
| WO | WO 00/20483 | 4/2000 |
| WO | WO 00/37242 | 6/2000 |
| WO | WO 00/37554 | 6/2000 |
| WO | WO 00/39232 | 7/2000 |
| WO | WO 00/40629 | 7/2000 |
| WO | WO 00/52086 | 9/2000 |
| WO | WO 01/57130 | 8/2001 |
| WO | WO 01/88033 | 11/2001 |
| WO | WO 02/070620 A1 | 9/2002 |
| WO | WO 02/088214 A1 | 11/2002 |
| WO | WO 03/011954 A1 | 2/2003 |
| WO | WO 03/018688 A1 * | 3/2003 |
| WO | WO 03/072677 A1 | 9/2003 |
| WO | WO 03/078163 A1 | 9/2003 |
| WO | WO 2004/050740 A1 | 6/2004 |
| WO | WO 2004/055092 A1 | 7/2004 |

OTHER PUBLICATIONS

Written Opinion dated Oct. 20, 2003 for International Application No. PCT/US03/09124.
International Search Report dated Jul. 29, 2003.
"The Epoxy Book", A System Three Resins Publication, pp. 1–41, System Three Resins, Inc., Seattle, Washington.
"Epoxy Resins", Second Edition Encyclopedia of Polymer Science and Engineering, vol. 6, pp. 322–382, 1985.
Copending U.S. Appl. No. 09/923,138, filed Aug. 6, 2001.
Copending U.S. Appl. No. 09/459,756, filed Dec. 10, 1999.
Written Opinion dated Oct. 20, 2003 for International Application No. PCT/US03/09124.

*Primary Examiner*—David J. Buttner
*Assistant Examiner*—Christopher Keehan
(74) *Attorney, Agent, or Firm*—Dobrusin & Thennisch PC

(57) ABSTRACT

An activatable (e.g., heat expandable) material and articles incorporating the same is disclosed. The material includes an epoxy resin; an epoxy/elastomer hybrid or reaction product; a blowing agent; a curing agent; and optionally, a filler. In preferred embodiments, the material includes aramid fiber, nanoclay or both.

27 Claims, 1 Drawing Sheet

U.S. PATENT DOCUMENTS

| | | | |
|---|---|---|---|
| 6,103,784 A | 8/2000 | Hilborn et al. | |
| 6,133,335 A | 10/2000 | Mahoney et al. | |
| 6,136,398 A | 10/2000 | Willett et al. | |
| 6,136,944 A | 10/2000 | Stewart et al. | |
| 6,153,302 A | 11/2000 | Karim et al. | |
| 6,162,504 A | 12/2000 | Hubert et al. | |
| 6,174,932 B1 | 1/2001 | Pachi et al. | |
| 6,218,442 B1 | 4/2001 | Hilborn et al. | |
| 6,228,449 B1 | 5/2001 | Meyer | |
| 6,232,433 B1 | 5/2001 | Narayan | |
| 6,235,842 B1 | 5/2001 | Kuwano et al. | |
| 6,263,635 B1 | 7/2001 | Czaplicki | |
| 6,277,898 B1 | 8/2001 | Pachl et al. | |
| 6,287,669 B1 | 9/2001 | George et al. | |
| 6,296,298 B1 | 10/2001 | Barz | |
| 6,303,672 B1 | 10/2001 | Papalos et al. | |
| 6,311,452 B1 | 11/2001 | Barz et al. | |
| 6,312,668 B2 | 11/2001 | Mitra et al. | |
| 6,319,964 B1 | 11/2001 | Blank et al. | |
| 6,348,513 B1 | 2/2002 | Hilborn et al. | |
| 6,350,791 B1 | 2/2002 | Feichtmeier et al. | |
| 6,358,584 B1 | 3/2002 | Czaplicki | |
| 6,376,564 B1 | 4/2002 | Harrison | |
| 6,419,305 B1 | 7/2002 | Larsen | |
| 6,429,244 B1 | 8/2002 | Rinka et al. | |
| 6,432,475 B1 | 8/2002 | Yamamoto et al. | |
| 6,437,055 B1 | 8/2002 | Moriarity et al. | |
| 6,440,257 B1 | 8/2002 | Zhou et al. | |
| 6,441,075 B2 | 8/2002 | Hirata et al. | |
| 6,441,081 B1 | 8/2002 | Sadatoshi et al. | |
| H2047 H | 9/2002 | Harrison et al. | |
| 6,444,149 B1 | 9/2002 | Valentinsson | |
| 6,444,713 B1 | 9/2002 | Pachl et al. | |
| 6,448,338 B1 | 9/2002 | Born et al. | |
| 6,451,231 B1 | 9/2002 | Harrison et al. | |
| 6,451,876 B1 | 9/2002 | Koshy | |
| 6,455,146 B1 | 9/2002 | Fitzgerald | |
| 6,455,476 B1 | 9/2002 | Imai et al. | |
| 6,467,834 B1 | 10/2002 | Barz et al. | |
| 6,471,285 B1 | 10/2002 | Czaplicki et al. | |
| 6,479,560 B2 | 11/2002 | Freitag et al. | |
| 6,482,486 B1 | 11/2002 | Czaplicki et al. | |
| 6,486,256 B1 | 11/2002 | Tarbutton et al. | |
| 6,506,494 B2 | 1/2003 | Brandys et al. | |
| 6,518,324 B1 * | 2/2003 | Kresta et al. | 521/83 |
| 6,561,571 B1 | 5/2003 | Brennecke | |
| 6,573,309 B1 | 6/2003 | Reitenbach et al. | |
| 6,620,501 B1 | 9/2003 | Kassa et al. | |
| 6,682,818 B2 | 1/2004 | Czaplicki et al. | |
| 6,706,772 B2 | 3/2004 | Czaplicki et al. | |
| 6,709,741 B1 * | 3/2004 | Lin et al. | 428/355 EP |
| 6,730,713 B2 | 5/2004 | Czaplicki | |
| 6,740,379 B1 | 5/2004 | Congard et al. | |
| 6,740,399 B1 | 5/2004 | George et al. | |
| 6,753,379 B1 | 6/2004 | Kawate et al. | |
| 2002/0009582 A1 * | 1/2002 | Golden | |
| 2002/0024233 A1 | 2/2002 | Kleino | |
| 2002/0120064 A1 | 8/2002 | Khandpur et al. | |
| 2002/0123575 A1 | 9/2002 | Kato et al. | |
| 2002/0136891 A1 | 9/2002 | Khandpur et al. | |
| 2002/0137808 A1 | 9/2002 | Gehlsen et al. | |
| 2002/0187305 A1 | 12/2002 | Czaplicki et al. | |
| 2003/0049453 A1 | 3/2003 | Czaplicki et al. | |
| 2003/0050352 A1 | 3/2003 | Guenther et al. | |
| 2003/0060522 A1 | 3/2003 | Czaplicki et al. | |
| 2003/0060523 A1 | 3/2003 | Czaplicki | |
| 2003/0069335 A1 | 4/2003 | Czaplicki et al. | |
| 2003/0187129 A1 | 10/2003 | Bell et al. | |
| 2004/0033324 A1 | 2/2004 | Meyer | |
| 2004/0048060 A1 | 3/2004 | Kassa | |
| 2004/0048078 A1 | 3/2004 | Czaplicki et al. | |
| 2004/0063800 A1 | 4/2004 | Brantl et al. | |
| 2004/0079478 A1 | 4/2004 | Merz | |

* cited by examiner

ACTIVATABLE MATERIAL

CLAIM OF BENEFIT OF FILING DATE

The present application claims the benefit of the filing date of U.S. Provisional Application Ser. No. 60/369,001 (filed Apr. 1, 2002), hereby incorporated by reference.

FIELD OF THE INVENTION

The present invention relates generally to an activatable (e.g., heat expandable) material and a method of forming and applying the same.

BACKGROUND OF THE INVENTION

For many years, industry has been concerned with designing materials such as adhesives, structural materials or combinations thereof. As examples, the transportation industry and, particularly, the automotive industry has been concerned with designing adhesive structural materials that do not add significantly to the weight of a vehicle, exhibit adhesive strength, have high strength to weight ratios or the like. Design of such materials can present difficulties however. For example, it can be difficult to design and incorporate lower weight materials that continue to exhibit desired levels of strength, adhesivity or the like. As another example, components of materials that impart various different characteristics to the materials can often be incompatible. Thus, there is a need to provide materials that overcome one or more of these difficulties.

SUMMARY OF THE INVENTION

Accordingly, the present invention provides a material, which may be employed for sealing, baffling, reinforcing, structural bonding or the like of a variety of structures. The material is typically an expandable adhesive material and also typically includes one or more of the following components: an epoxy resin; an elastomer-containing adduct; a reinforcement material; a filler; a blowing agent; a curing agent; an accelerator for the blowing agent or the curing agent; combinations thereof or the like. One preferred epoxy resin is a liquid bisphenol A epoxy. One preferred elastomer containing adduct is a solid epoxy-carboxyl terminated butyl nitrile rubber adduct. One preferred reinforcement material is a pulped form of aramid fiber, which can assist in flow control of the material.

The material may be formed according to a variety of protocols. In one preferred method, the various components of the material are intermixed in one or more continuous or batch-type mixing processes. Preferably, upon formation, the material is relatively tacky. The material may be applied (e.g., adhered) to a variety of structures, which may be formed of a variety of materials such as aluminum, magnesium, steel, sheet molding compound, bulk molding compound, thermoplastics, combinations thereof or the like. According to one preferred embodiment, the material is applied to a frame rail of an automotive vehicle such as a sport utility vehicle. Moreover the material may be employed in a variety of applications such as bonding members together, reinforcing members, filling a seam between members or the like. The material may be employed for sealing a seam, preventing fatigue crack growth, adhering a reinforcement or the like within the frame rail or other portion of the automotive vehicle. Preferably, the material and members having the material applied thereto increase stiffness of members in an automotive vehicle or other article of manufacture.

BRIEF DESCRIPTION OF THE DRAWINGS

The features and inventive aspects of the present invention will become more apparent upon reading the following detailed description, claims and drawings, of which the following is a brief description:

DETAILED DESCRIPTION OF THE INVENTION

Figure 1:
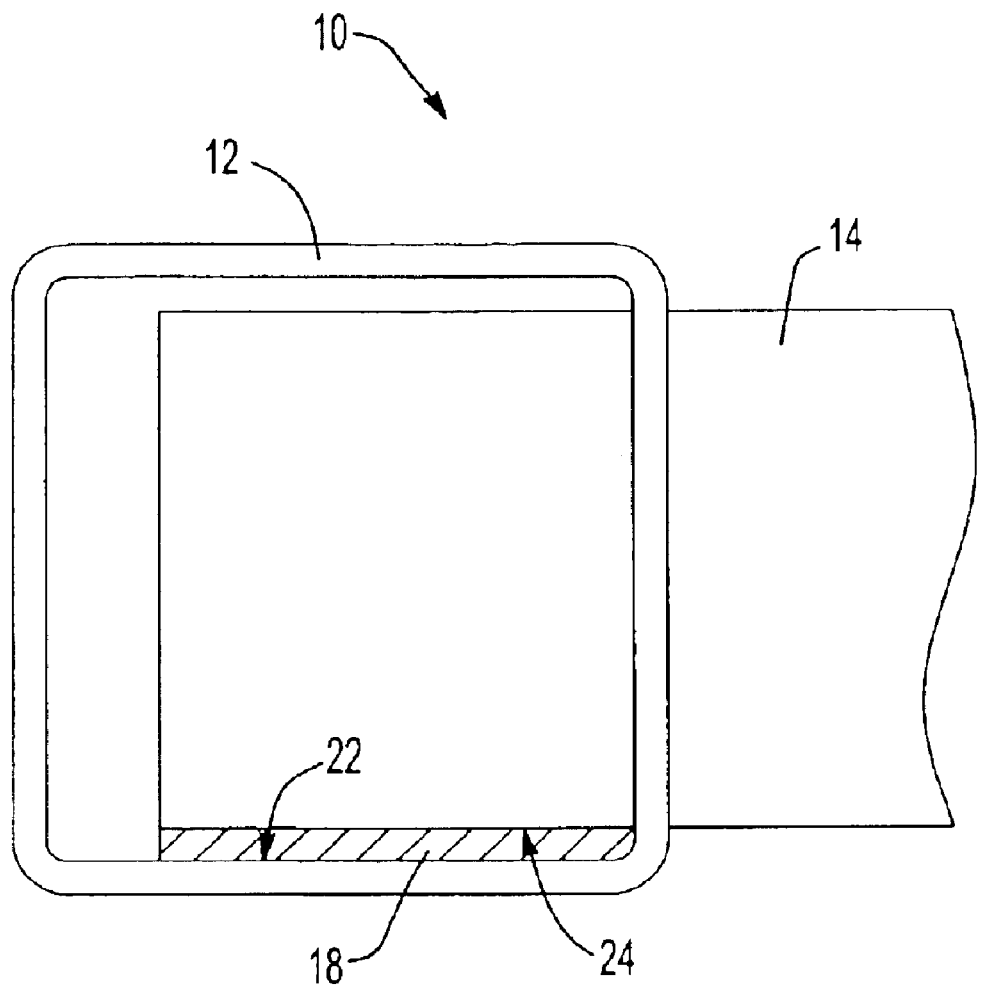
FIG. 1 is a sectional view of a joint of a frame assembly of an automotive vehicle.

The present invention is predicated upon providing an improved activatable material, and articles incorporating the same. The activatable material preferably expands upon activation by heat or other condition, and is hereinafter referred to as an expandable material. It is contemplated, however, that certain embodiments of the material may be substantially non-expansive.

Typically, the expandable material assists in providing structural reinforcement, adhesion, sealing, acoustical damping properties or a combination thereof within a cavity of or upon a surface of a structure, or to one or more structural members (e.g., a body panel or structural member) of an article of manufacture (e.g., an automotive vehicle).

The expandable material preferably includes:
(a) up to about 80 parts by weight of an epoxy resin;
(b) up to about 70 parts by weight of an elastomer-containing adduct;
(c) up to about 5 parts by weight of a blowing agent;
(d) up to about 7 parts by weight of a curing agent; and
(e) a filler.

The expandable material of the present invention may be applied to various articles of manufacture for adding structural integrity to portions or members of articles, for providing acoustical damping to the articles or for sealing the articles. Examples of such articles of manufacture include, without limitation, household or industrial appliances, furniture, storage containers, buildings, structures or the like. In preferred embodiments, the expandable material is applied to portions of an automotive vehicle such as body or frame members (e.g., a vehicle frame rail) of the automotive vehicle. One method of the present invention contemplates applying the expandable material to a surface of one of the above structures in an unexpanded or partially expanded state and activating the material for expanding it to a volume greater than its volume in the unexpanded state (e.g., 100% greater, 500% greater, 1000% greater, 2000% greater, 5000% greater or higher).

Percentages herein refer to weight percent, unless otherwise indicated.

Epoxy Resin

Epoxy resin is used herein to mean any of the conventional dimeric, oligomeric or polymeric epoxy materials containing at least one epoxy functional group. The polymer-based materials may be epoxy containing materials having one or more oxirane rings polymerizable by a ring opening reaction. In preferred embodiments, the structural adhesive material includes up to about 80% of an epoxy resin. More preferably, the expandable includes between about 10% and 70% by weight epoxy resin and still more preferably between about 40% and 60% by weight epoxy resin.

The epoxy may be aliphatic, cycloaliphatic, aromatic or the like. The epoxy may be supplied as a solid (e.g., as pellets, chunks, pieces or the like) or a liquid (e.g., an epoxy resin). The epoxy may include an ethylene copolymer or terpolymer that may possess an alpha-olefin. As a copolymer or terpolymer, the polymer is composed of two or three different monomers, i.e., small molecules with high chemical reactivity that are capable of linking up with similar molecules. Preferably, an epoxy resin is added to the expandable material to increase adhesion properties of the material. One exemplary epoxy resin may be a phenolic resin, which may be a novalac type or other type resin. Other preferred epoxy containing materials may include a bisphenol-A epichlorohydrin ether polymer, or a bisphenol-A epoxy resin which may be modified with butadiene or another polymeric additive.

Elastomer-Containing Adduct

In a highly preferred embodiment, an elastomer-containing adduct is employed in the composition of the present invention, and preferably in a relatively high concentration (e.g., on the order of the epoxy resin). The epoxy/elastomer hybrid or reaction product may be included in an amount of up to about 80% by weight of the expandable material. More preferably, the elastomer-containing adduct is approximately 20 to 50%, and more preferably is about 30% to 40% by weight of the expandable material.

In turn, the adduct itself generally includes about 1:5 to 5:1 parts of epoxy to elastomer, and more preferably about 1:3 to 3:1 parts or epoxy to elastomer. The elastomer compound may be any suitable art disclosed elastomer such as a thermosetting elastomer. Exemplary elastomers include, without limitation natural rubber, styrene-butadiene rubber, polyisoprene, polyisobutylene, polybutadiene, isoprene-butadiene copolymer, neoprene, nitrile rubber (e.g., a butyl nitrile, such as carboxy-terminated butyl nitrile), butyl rubber, polysulfide elastomer, acrylic elastomer, acrylonitrile elastomers, silicone rubber, polysiloxanes, polyester rubber, diisocyanate-linked condensation elastomer, EPDM (ethylene-propylene diene rubbers), chlorosulphonated polyethylene, fluorinated hydrocarbons and the like. In one embodiment, recycled tire rubber is employed.

The elastomer-containing adduct, when added to the expandable material, preferably is added to modify structural properties of the expandable material such as strength, toughness, stiffness, flexural modulus, or the like. Additionally, the elastomer-containing adduct may be selected to render the expandable material more compatible with coatings such as water-borne paint or primer system or other conventional coatings.

Blowing Agent

One or more blowing agents may be added to the expandable material for producing inert gasses that form, as desired, an open and/or closed cellular structure within the expandable material. In this manner, it may be possible to lower the density of articles fabricated from the material. In addition, the material expansion helps to improve sealing capability, substrate wetting ability, adhesion to a substrate, acoustic damping, combinations thereof or the like.

The blowing agent may include one or more nitrogen containing groups such as amides, amines and the like. Examples of suitable blowing agents include azodicarbonamide, dinitrosopentamethylenetetramine, 4,4$_i$-oxy-bis-(benzenesulphonylhydrazide), trihydrazinotriazine and N,N$_i$-dimethyl-N,N$_i$ -dinitrosoterephthalamide.

An accelerator for the blowing agents may also be provided in the expandable material. Various accelerators may be used to increase the rate at which the blowing agents form inert gasses. One preferred blowing agent accelerator is a metal salt, or is an oxide, e.g. a metal oxide, such as zinc oxide. Other preferred accelerators include modified and unmodified thiazoles or imidazoles, ureas or the like.

Amounts of blowing agents and blowing agent accelerators can vary widely within the expandable material depending upon the type of cellular structure desired, the desired amount of expansion of the expandable material, the desired rate of expansion and the like. Exemplary ranges for the amounts of blowing agents and blowing agent accelerators in the expandable material range from about 0% by weight to about 5% by weight and are preferably in the expandable material in fractions of weight percentages.

In one embodiment, the present invention contemplates the omission of a blowing agent. Thus it is possible that the material will not be an expandable material. Preferably, the formulation of the present invention is thermally activated. However, other agents may be employed for realizing activation by other means, such as moisture, radiation, or otherwise.

Curing Agent

One or more curing agents and/or curing agent accelerators may be added to the expandable material. Amounts of curing agents and curing agent accelerators can, like the blowing agents, vary widely within the expandable material depending upon the type of cellular structure desired, the desired amount of expansion of the expandable material, the desired rate of expansion, the desired structural properties of the expandable material and the like. Exemplary ranges for the curing agents or curing agent accelerators present in the expandable material range from about 0% by weight to about 7% by weight.

Preferably, the curing agents assist the expandable material in curing by crosslinking of the polymers, epoxy resins (e.g., by reacting in stoichiometrically excess amounts of curing agent with the epoxide groups on the resins) or both. It is also preferable for the curing agents to assist in thermosetting the expandable material. Useful classes of curing agents are materials selected from aliphatic or aromatic amines or their respective adducts, amidoamines, polyamides, cycloaliphatic amines, (e.g., anhydrides, polycarboxylic polyesters, isocyanates, phenol-based resins (such as phenol or cresol novolak resins, copolymers such as those of phenol terpene, polyvinyl phenol, or bisphenol-A formaldehyde copolymers, bishydroxyphenyl alkanes or the like), or mixtures thereof. Particular preferred curing agents include modified and unmodified polyamines or polyamides such as triethylenetetramine, diethylenetriamine tetraethylenepentamine, cyanoguanidine, dicyandiamides and the like. An accelerator for the curing agents (e.g., a modified or unmodified urea such as methylene diphenyl bis urea, an imidazole or a combination thereof) may also be provided for preparing the expandable material.

Though longer curing times are also possible, curing times of less than 5 minutes, and even less than 30 seconds are possible for the formulation of the present invention. Moreover, such curing times can depend upon whether additional energy (e.g., heat, light, radiation) is applied to the material or whether the material is cured at room temperature.

Filler

The expandable material may also include one or more fillers, including but not limited to particulated materials (e.g., powder), beads, microspheres, or the like. Preferably the filler includes a relatively low-density material that is generally non-reactive with the other components present in the expandable material.

Examples of fillers include silica, diatomaceous earth, glass, clay, talc, pigments, colorants, glass beads or bubbles, glass, carbon ceramic fibers, antioxidants, and the like. Such fillers, particularly clays, can assist the expandable material in leveling itself during flow of the material. The clays that may be used as fillers may include clays from the kaolinite, illite, chloritem, smecitite or sepiolite groups, which may be calcined. Examples of suitable fillers include, without limitation, talc, vermiculite, pyrophyllite, sauconite, saponite, nontronite, montmorillonite or mixtures thereof. The clays may also include minor amounts of other ingredients such as carbonates, feldspars, micas and quartz. The fillers may also include ammonium chlorides such as dimethyl ammonium chloride and dimethyl benzyl ammonium chloride. Titanium dioxide might also be employed.

In one preferred embodiment, one or more mineral or stone type fillers such as calcium carbonate, sodium carbonate or the like may be used as fillers. In another preferred embodiment, silicate minerals such as mica may be used as fillers. It has been found that, in addition to performing the normal functions of a filler, silicate minerals and mica in particular improved the impact resistance of the cured expandable material.

When employed, the fillers in the expandable material can range from 10% to 90% by weight of the expandable material. According to some embodiments, the expandable material may include from about 0.001% to about 30% by weight, and more preferably about 10% to about 20% by weight clays or similar fillers. Powdered (e.g. about 0.01 to about 50, and more preferably about 1 to 25 micron mean particle diameter) mineral type filler can comprise between about 5% and 70% by weight, more preferably about 10% to about 20%, and still more preferably approximately 13% by weight of the expandable material.

It is contemplated that one of the fillers or other components of the material may be thixotropic for assisting in controlling flow of the material as well as properties such as tensile, compressive or shear strength.

Other Additives

Other additives, agents or performance modifiers may also be included in the expandable material as desired, including but not limited to a UV resistant agent, a flame retardant, an impact modifier, a heat stabilizer, a UV photoinitiator, a colorant, a processing aid, a lubricant, a reinforcement (e.g., chopped or continuous glass, ceramic, aramid, or carbon fiber or the like).

When determining appropriate components for the expandable material, it may be important to form the material such that it will only activate (e.g., flow, foam or otherwise change states) at appropriate times or temperatures. For instance, in most applications, it is undesirable for the material to be reactive at room temperature or otherwise at the ambient temperature in a production environment. More typically, the expandable material becomes activated to flow at higher processing temperatures. As an example, temperatures such as those encountered in an automobile assembly plant may be appropriate, especially when the expandable material is processed along with the other components at elevated temperatures or at higher applied energy levels, e.g., during painting preparation steps. Temperatures encountered in many coating operations (e.g., in a paint curing oven), for instance, range up to about 250° C. or higher.

Highly Preferred Embodiments and Examples

It is contemplated within the present invention that polymers other than those discussed above such as thermoplastics may also be incorporated into the expandable material, e.g., by copolymerization, by blending, or otherwise. For example, without limitation, other polymers that might be appropriately incorporated into the expandable material include halogenated polymers, polycarbonates, polyketones, urethanes, polyesters, silanes, sulfones, allyls, olefins, styrenes, acrylates, methacrylates, epoxies, silicones, phenolics, rubbers, polyphenylene oxides, terphthalates, acetates (e.g., EVA), acrylates, methacrylates (e.g., ethylene methyl acrylate polymer) or mixtures thereof. Other potential polymeric materials may be or may include include, without limitation, polyethylene, polypropylene, polystyrene, polyolefin, polyacrylate, poly(ethylene oxide), poly(ethyleneimine), polyester, polyurethane, polysiloxane, polyether, polyphosphazine, polyamide, polyimide, polyisobutylene, polyacrylonitrile, poly(vinyl chloride), poly(methyl methacrylate), poly(vinyl acetate), poly(vinylidene chloride), polytetrafluoroethylene, polyisoprene, polyacrylamide, polyacrylic acid, polymethacrylate.

In highly preferred embodiments, however, the expandable material is substantially devoid of thermoplastic polymers or thermoplastic polymer blends, which can increase glass transition temperatures of the material. Particularly, certain embodiments of the expandable material are devoid of thermoplastic polymers such as acetates (e.g., EVA) and acrylates (e.g., EMA). In such embodiments, the expandable material is preferably composed of greater than about 40% by weight of an epoxy resin such as Bis-phenol A liquid epoxy, greater than about 30% by weight of an epoxy/elastomer adduct such as solid epoxy-carboxyl terminated butyl nitrile (CTBN) rubber adduct and a fiber such as a pulped form of aramid fiber. Such embodiments are particularly advantageous because the aramid fiber in combination with the epoxy-elastomer component of the expandable material and the other components allows for the formation of a tacky product with good physical integrity without the use of certain thermoplastic polymers (e.g., EVA or EMA), which tend to exhibit poor compatibility in an epoxy based system and can reduce strength and adhesion durability.

Additionally, in highly preferred embodiments, a nanoclay additive may be used for added control of flow properties, physical properties, adhesion durability, hydrolysis resistance, combinations thereof or the like. Nanoclay may be include from about 0.1% to about 4% by weight of the expandable material, more preferably from about 0.5% to about 2% by weight, and even more preferably about 1% by weight of the expandable material.

EXAMPLES

Table A of exemplary expandable materials is provided below.

TABLE A

| Ingredient | Material A Wt %s | Material B Wt %s | Material C Wt %s |
|---|---|---|---|
| Standard Liquid Epoxy | 43.83% | 44.11% | 43.50% |
| Solid Epoxy-CTBN Adduct | 36.07% | 36.27% | 35.80% |
| Calcined Clay | 12.29% | 12.74% | 12.20% |
| Aramide Fiber (opened) | 1.46% | 1.47% | 1.45% |
| Nanoclay | 0.98% | 0.98% | 0.97% |
| Dicyandiamide | 3.65% | 3.12% | 3.63% |
| Modified Urea | 1.01% | 0.89% | 1.0% |
| Modified Imidazole | 0.50% | 0% | 0.5% |
| Azodicarbonamide | 0.00% | 0.28% | 0.75% |
| Pigment | 0.20% | 0.14% | 0.20% |

Formation and Application of the Expandable Material

Formation of the expandable material can be accomplished according to a variety of new or known techniques. Preferably, the expandable material is formed as a material of substantially homogeneous composition. However, it is contemplated that various combining techniques may be used to increase or decrease the concentration of certain components in certain locations of the expandable material.

According to one embodiment, the expandable material is formed by supplying the components of the material in solid form such as pellets, chunks and the like, in liquid form or a combination thereof. The components are typically combined in one or more containers such as large bins or other containers. Preferably, the containers can be used to intermix the components by rotating or otherwise moving the container. Thereafter, heat, pressure or a combination thereof may be applied to soften or liquidize the components such that the components can be intermixed by stirring or otherwise into a single homogenous composition.

According to another embodiment, the expandable material may be formed by heating one or more of the components that is generally easier to soften or liquidize such as the polymer based materials to induce those components into a mixable state. Thereafter, the remaining components may then be intermixed with the softened components.

Depending upon the components used, it may be important to assure that the temperature of the components remains below certain activation temperatures that might cause the expandable material to activate (e.g., form gasses, flow or otherwise activate), cure (e.g., harden, stiffen or otherwise change states) or both. Notably, when the expandable material contains a blowing agent, it is typically desirable to maintain the temperature of the expandable material below a temperature that will activate the blowing agent during formation of the expandable material or before the expandable material is applied to a surface.

In situations where it is desirable to maintain the expandable material at lower temperatures it may be desirable to maintain the components in a semi-solid or viscoelastic state using pressure or a combination of pressure and heat to intermix the components of the expandable material. Various machines have been designed to applying heat, pressure or both to materials. One preferred machine is an extruder. According to one embodiment of the present invention, various components may be premixed into one, two or more pre-mixtures and introduced at one or various locations in a single or twin-screw extruder. Thereafter, the heat and pressure provided by the extruder mixes the expandable material in a single generally homogeneous composition, and preferably does so without activating the material.

Activation of the material may include at least some degree of foaming or bubbling in situations where the expandable material includes a blowing agent. Such foaming or bubbling can assist the expandable material in wetting a substrate and forming an intimate bond with the substrate. Alternatively, however, it shall be recognized that the expandable material may be activated to flow without foaming or bubbling and may still substantially wet the substrate to form an intimate bond. Formation of the intimate bond will typically but not necessarily occur upon curing of the expandable material.

Advantageously, the expandable material of the present invention has shown valuable properties. Upon testing, valuable properties were exhibited for expansion, for lap shear and for adhesive t-peel. Table B below lists the properties exhibited by the expandable materials that had their corresponding ingredients listed in table A, but is also indicative of properties from other formulations of the materials of the present invention. The present invention contemplates resulting material properties within about +/− 25% and more preferably 50% of the recited properties. The properties in table B were exhibited by materials that were adhered to substrates with bondlines of about 0.25 mm or about 0.01 inches.

The formulation of the present invention may be applied to a surface by any suitable means, such as coating or extruding. In one embodiment, a robotic extrusion applicator is employed, e.g., of the type disclosed in U.S. Pat. No. 5,358,397, hereby incorporated by reference.

TABLE B

| Ingredient | Material A | Material B | Material C |
| --- | --- | --- | --- |
| Expansion | | | |
| 340° F./20 minutes | 9% | 47% | 107% |
| 400° F./30 minutes | 31% | 81% | 162% |
| Lap Shear, psi | 3158 | 2415 | 1819 |
| T-peel, ppi | 57.06 | 39.0 | 16.40 |

As can be seen the lap shear strength remains quite high despite the high variation in expansion of the materials. Moreover, the t-peel performance remains relatively high at higher levels of expansion when compared to conventional expanding systems. Exhibition of such properties is particularly advantageous in light of the formulations of the expandable materials. The expandable materials of Table A maintain good t-peel performance and are substantially provided without additives such as epoxy flexibilizers (e.g., acrylic, or urethane based materials) and core/shell polymers, which might decrease adhesivity or t-peel performance and also typically lower glass transition temperatures of material. Thus, the expandable materials of the present invention provide the flexibility of relatively high glass transition temperatures coupled with relatively high strength, adhesion and peel characteristics.

In another embodiment of the present invention, an outer surface of the material of the present invention is treated for allowing it to be handled without undesirable material transfer, such as to a vehicle body surface. Thus, it is possible that the formulation may be provided with a temporary layer (from less than about 10 microns to about 2 cm (e.g., on the order of less than about 1 mm)) that is generally free of tack for facilitating handling. This may take the form of a plastic transfer film, a water based coating, a powder coating or otherwise. The present invention thus also contemplates a tacky structural adhesive material having a handling surface that is generally free of tack to the touch.

Other applications for which the present technology may be adapted or employed as an expandable material include those of the type identified in U.S. Pat. Nos. 6,358,584; 6,311,452; 6,296,298, all of which are hereby incorporated by reference. The material of the present invention may thus be applied to a carrier, such as a molded, extruded or stamped member (e.g., metal or plastic, foamed or unfoamed; exemplary materials of which include aluminum, magnesium, titanium, steel, polyamide (e.g., nylon 6 or nylon 6,6), polysulfone, thermoplastic imide, polyether imide, polyether sulfone or mixtures thereof.

Referring to FIG. 1, there is illustrated an exemplary embodiment of a joint 10 between a first member 12 and a second member 14. In the embodiment illustrated, the first member 12 is a side rail of an automotive vehicle and the second member is a cross-rail of the automotive vehicle. However, it shall be understood that the expandable material of the present invention may be applied to various members of various different articles of manufacture. As can be seen, an amount of expandable material 18 of the present invention has been positioned between a surface 22 of the first member 12 and a surface 24 of the second member 14. Upon expansion, the expandable material 18 preferably wets and adheres to the surfaces 22, 24 of the members 12, 14. Simultaneously or thereafter, the expandable material 18 is preferably cured (e.g., by cooling) to form a structural foam that attaches the members 12, 14 together and provides sealing, baffling, reinforcement or the like to the members 12, 14 and/or the joint 10.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. An adhesive expandable material, comprising:
    greater than 40% by weight of an epoxy resin;
    greater than 30% by weight epoxy/elastomer adduct, the adduct being a reaction product of an epoxy and an elastomer;
    a fiber reinforcement material intermixed in the adhesive material; and
    a nanoclay;
    wherein the adhesive expandable material is substantially devoid of EMA and EVA.

2. An adhesive expandable material as in claim 1 wherein the expandable material is substantially devoid of acetates and acrylates.

3. An adhesive expandable material as in claim 1 wherein the expandable material is substantially devoid of thermoplastic polymers.

4. An adhesive expandable material as in claim 1 wherein the expandable material includes a curing agent and a blowing agent.

5. An adhesive expandable material as in claim 4, wherein the epoxy/elastomer adduct is an epoxy-carboxyl terminated butyl nitrile rubber adduct.

6. An adhesive expandable material as in claim 4, wherein the epoxy/elastomer adduct includes about 1:3 to 3:1 parts of epoxy to elastomer.

7. An adhesive expandable material as in claim 6, further comprising about 0.1% to about 4.0% by weight nanoclay.

8. An adhesive expandable material as in claim 1, wherein the expandable material exhibit a lap shear greater than about 2000 psi.

9. An adhesive expandable material, comprising:
    greater than about 40% by weight of an epoxy resin, the epoxy resin being substantially entirely a bisphenol A liquid epoxy;
    greater than about 30% by weight epoxy/elastomer adduct, the epoxy/elastomer adduct being a solid epoxy-carboxyl terminated butyl nitrile (CTBN) rubber adduct;
    fiber reinforcement material, the fiber reinforcement material being a pulped aramid fiber; and
    about 0.1% to about 4.0% by weight nanoclay;
    wherein the adhesive expandable material is substantially devoid of polymers acetate and acrylate polymers.

10. An adhesive expandable material as in claim 9 wherein the expandable material is substantially devoid of thermoplastic polymers.

11. An adhesive expandable material as in claim 10 wherein the expandable material includes a curing agent and a blowing agent.

12. An adhesive expandable material as in claim 11, wherein the epoxy/elastomer adduct includes about 1:3 to 3:1 parts of epoxy to elastomer.

13. An adhesive expandable material as in claim 1, wherein the expandable material exhibit a lap shear greater than about 2000 psi.

14. An adhesive expandable material, comprising:
    about 40% to about 60% by weight of an epoxy resin, the epoxy resin being substantially entirely a bisphenol A liquid epoxy;
    about 30% to about 50% by weight epoxy/elastomer adduct, the epoxy/elastomer adduct being a solid epoxy-carboxyl terminated butyl nitrile (CTBN) rubber adduct;
    a blowing agent selected from the group consisting of an amide and an amine;
    a curing agent selected from the group consisting of polyamine and polyamide;
    fiber reinforcement material, the fiber reinforcement material being a pulped aramid fiber; and
    about 0.1% to about 4.0% by weight nanoclay;
    wherein the adhesive expandable material is substantially free of thermoplastic polymers and the expandable material exhibits expansion to greater than 100% of its original size upon activation.

15. An adhesive expandable material as in claim 14, wherein the epoxy elastomer adduct includes about 1:3 to 3:1 parts of epoxy to elastomer.

16. An activatable material, comprising:
    an adhesive expandable material including:
    i) about 10% to about 70% by weight of an epoxy resin; and
    ii) about 20% to about 50% by weight epoxy/elastomer adduct wherein the adduct is a reaction product of an epoxy and an elastomer;
    iii) a fiber reinforcement intermixed within the adhesive material; and
    iv) a nanoclay; and
    a substantially tack free handling surface disposed upon the adhesive expandable material.

17. An activatable material as in claim 16 wherein the handling surface is provided by a layer disposed upon the adhesive expandable material.

18. An activatable material as in claim 17 wherein the layer is temporary.

19. An activatable material, comprising:
    an adhesive expandable material including:
    i) about 10% to about 70% by weight of an epoxy resin; and
    ii) about 20% to about 50% by weight epoxy/elastomer adduct; and
    a substantially tack free handling surface disposed upon the adhesive expandable material;
    wherein the handling surface is provided by a layer dispose upon the adhesive expandable material; and
    wherein the layer is less than about 10 microns thick.

20. An activatable material as in claim 17 wherein the layer is between about 10 microns and about 2 centimeters thick.

21. An activatable material as in claim 17 wherein the layer is less than about 1 centimeter thick.

22. An activatable material as in claim 17 wherein the layer is formed of a water based coating or a powder coating.

23. An activatable material as in claim 16 wherein the adhesive expandable material is substantially devoid of EMA and EVA.

24. An activatable material as in claim 16 wherein the adhesive expandable material is substantially devoid of acetates and acrylates.

25. An activatable material as in claim 16 wherein;
   i) the epoxy resin is greater than about 40% by weight of th adhesive expandable material;
   ii) the epoxy/elastomer adduct is greater than about 30% weight of the adhesive expandable material;
   iii) the epoxy/elastomer adduct is a solid epoxy-carboxyl teminated butyl nitrile rubber adduct; and
   iv) the adhesive expandable material includes a fiber reinforcement material.

26. An activatable material, comprising:
   an adhesive expandable material including:
   i) about 40% to about 70% by weight of an epoxy resin;
   ii) about 30% to about 50% by weight epoxy/elastomer adduct wherein the epoxy/elastomer adduct is a solid epoxy-carboxyl teminated butyl nitrile rubber adduct;
   iii) about 0.1% to about 4.0% by weight nanoclay; and
   iv) a fiber reinforcement material
   a substantially tack free handling surface disposed upon the adhesive expandable material.

27. An activatable material as in claim 16 wherein the adhesive expandable material exhibit a lap shear greater than about 2000 psi.

* * * * *